United States Patent [19]

Nakashima

[11] Patent Number: 5,623,602

[45] Date of Patent: Apr. 22, 1997

[54] DATA TRANSMISSION CONFIRMATION BY SENDING FRAME WITH COMMAND TO CHANGE TRANSMITTER'S RESEND COUNTER WHEN RECEIVER'S BUFFER IS FULL

[75] Inventor: Toshihiro Nakashima, Tokyo, Japan

[73] Assignee: NEC Corporation, Tokyo, Japan

[21] Appl. No.: 44,485

[22] Filed: Apr. 9, 1993

[30]     Foreign Application Priority Data

Apr. 9, 1992 [JP] Japan .................................. 4-115210

[51] Int. Cl.⁶ ............................. G06F 13/00; G06F 13/12; G06F 13/42
[52] U.S. Cl. ..................... 395/200.13; 395/849; 395/250
[58] Field of Search ................................. 395/200, 575, 395/182.02, 185.01, 185.03, 200.13, 200.14, 200.1, 200.11, 849, 250

[56]                References Cited

U.S. PATENT DOCUMENTS 4,654,654   3/1987   Butler et al. ..................... 340/825.5
5,167,035  11/1992   Mann et al. ........................ 395/575

*Primary Examiner*—Thomas C. Lee
*Assistant Examiner*—D. Dinh
*Attorney, Agent, or Firm*—Sughrue, Mion, Zinn, Macpeak & Seas

[57]                ABSTRACT

A computer network system includes a plurality of computers and a network connected to the computers for allowing them to interchange data. Each computer has a data send module and a data receive module. The data send module is made up of a means for sending a data frame to the network in response to a send request, a resend number storing means for storing the number of times that the data frame is to be resent, and a means for updating the content of the resend number storing means upon receiving a frame for changing the number of times that the data frame is to be resent from the network. The data receive module includes a receive buffer for storing the data frame received from the network, and a means for sending, when the receive buffer is full, the frame for changing the number of times that the data frame is to be resent to the network.

16 Claims, 8 Drawing Sheets

DATA TRANSMISSION CONFIRMATION BY SENDING FRAME WITH COMMAND TO CHANGE TRANSMITTER'S RESEND COUNTER WHEN RECEIVER'S BUFFER IS FULL

BACKGROUND OF THE INVENTION

The present invention relates to a computer network system for allowing-computers interconnected by a network to interchange data and, more particularly, to a data send confirmation system in which a computer sends a data frame to a receiving computer and determines, on receiving a receive response frame from the receiving computer, that the data successfully reached the receiving computer.

Generally, in a computer network system, several ten to several hundred computers are interconnected by a network and send data asynchronously. It is likely with this kind of system that data sent from the computers conflict on the network or that the receiving computer discards received data due to an insufficient capacity of a receive buffer thereof. In the light of this, it has been customary to cause the receiving computer to return a receive response frame to the sending computer when it has received data correctly. However, the sending computer does not always obtain the receive response immediately since data sent from a great number of sending computers may conflict on the network. For this reason, the sending computer awaits the receive response from the receiving computer for a predetermined period of time given by the system. When the sending computer does not receive the receive response within the predetermined period of time, it again sends the same data to the receiving computer. Further, when the sending computer does not receive the receive response even after repeating the resending operation a predetermined number of times also given by the system, it executes error processing by determining that data transmission has failed. In the event that the sending computer cannot receive the receive response frame, it is a common practice to change the whole system, i.e., to change the number of times that data is to be resent by changing the firmware of each computer or to replace the receive buffer of each computer with a receive buffer having a greater capacity.

However, the conventional computer network system described above has some problems left unsolved, as follows. To begin with, assume that a great number of computers send data to a single computer asynchronously, and that the amount of the data exceeds the processing ability of the receiving computer. Then, the receiving computer simply discards the data due to the insufficient capacity of the receive buffer thereof and cannot return a receive response frame to any of the sending computers. This often occurs in, among other things, a local area network (LAN) whose data transfer rate is high. Specifically, in a LAN, it often occurs that a sending computer cannot obtain a receive response frame from a receiving computer even after resending data a predetermined number of times, resulting in a transmission failure. Another problem with the conventional system is that changing the firmware or replacing the receive buffer computer by computer requires a considerable number of steps and considerable time.

SUMMARY OF THE INVENTION

It is, therefore, an object of the present invention to provide a computer network system which prevents a plurality of computers interconnected by a network from failing to interchange data due to the insufficient buffer capacity thereof.

A computer network system of the present invention comprises a plurality of computers and a network connected to the computers for allowing them to interchange data. Each computer has a data send module and a data receive module. The data send module is made up of means for sending a data frame to the network in response to a send request, resend number storing means for storing the number of times that the data frame is to be resent, and means for updating the content of the resend number storing means upon on receiving a frame for changing the number of times that the data frame is to be resent from the network. The data receive module includes a receive buffer for storing the data frame received from the network, and means for sending, when the receive buffer is full, the frame for changing the number of times that the data frame is to be resent to the network.

BRIEF DESCRIPTION OF THE DRAWINGS

The features and advantages of the present invention will become apparent from the following description when taken in conjunction with the accompanying drawings in which.

In the figures, the same reference numerals designate similar or like constituents.

DETAILED DESCRIPTION OF THE PREFERRED EMBODIMENTS

Figure 1:
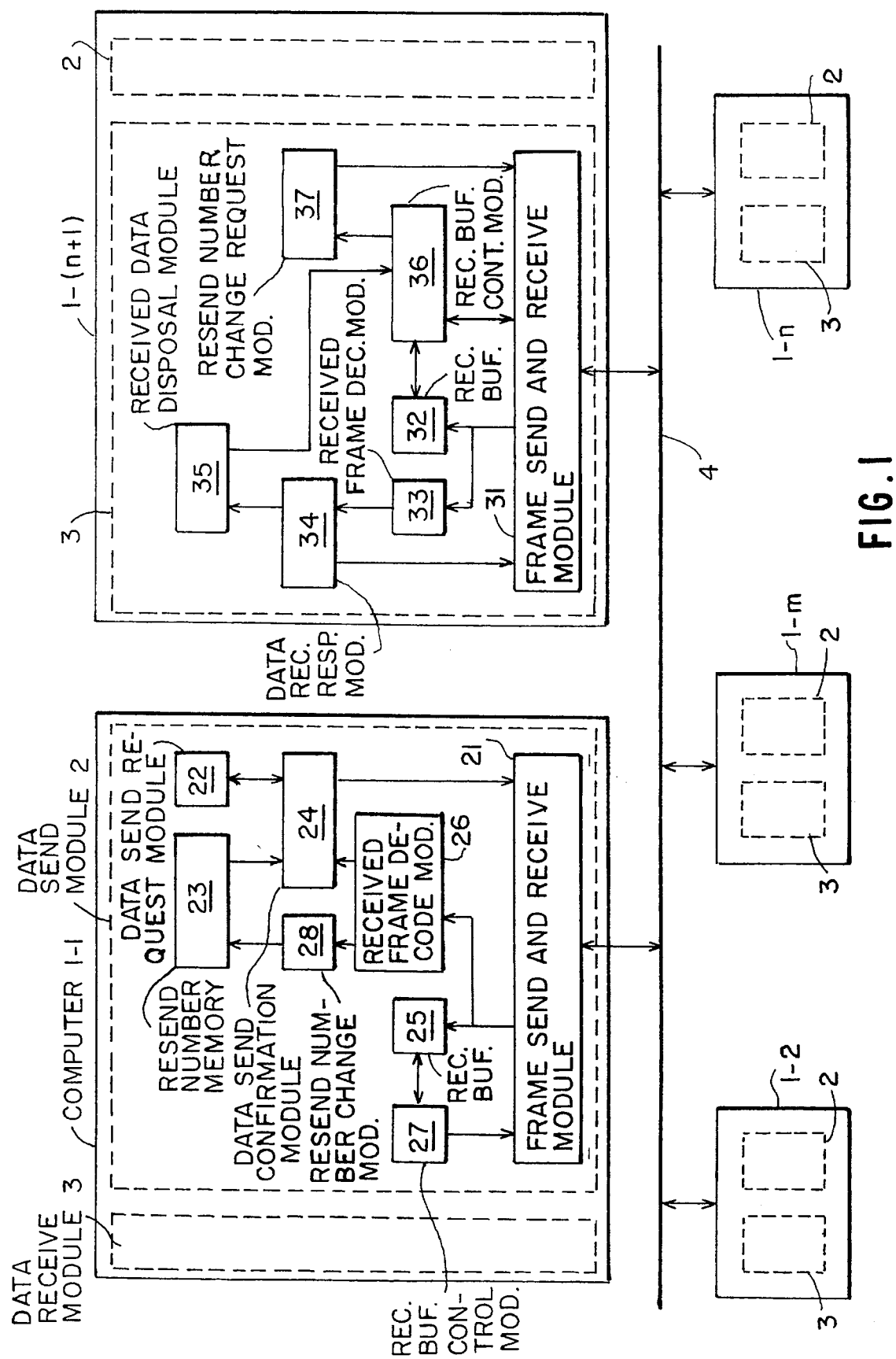
FIG. 1 is a block diagram schematically showing a computer network system embodying the present invention.

Referring to FIG. 1 of the drawings, a computer network system embodying the present invention is shown. As shown, a plurality of computers 1-1 to 1-(n+1) are interconnected by a network 4 to interchange data. The computers 1-1 to 1-(n+1) each has a data send module 2 and a data receive module 3.

The data send module 2 includes a frame send and receive module 21 for sending and receiving frames from the network 4. A data send request module 22 generates a data send request in the event of sending data. A resend number memory 23 stores the number of times that a data frame is to be resent. A data send confirmation module 24 has four different functions: a function of generating, in response to a data send request from the data send request module 22, a data frame to be sent and requesting the frame send and receive module 21 to output the data frame; a function of determining that data transmission to another computer was successful on reading a receive response frame returned from the computer; a function of resending the data frame when the receive response from another computer does not arrive within a predetermined period of time; and a function of determining, when the receive response does not arrive even after the data frame has been repetitively sent, that data transmission failed on the basis of the value of the resend number memory 23 and informing the data send request module 22 of the failure. A receive buffer 25 stores frames received by the frame send and receive module 21. A received frame decode module 26 decodes each of the frames received by the frame send and receive module 21 and executes processing for each type of frame received (e.g., data frames, receive response frames, etc., as explained hereinafter). A receive buffer control module 27 determines whether or not the receive buffer 25 is full. A resend number change module 28 updates the value of the resend number memory 23 on the basis of a resend number change request frame decoded by the receive frame decode module 26.

The data receive module 3 includes a frame send and receive module 31 for sending and receiving frames from the network 4. A receive buffer 32 stores frames received by the frame send and receive module 31. A received frame decode module 33 decodes each of the frames received by the frame send and receive module 31 and executes processing on each type of frame. A data receive response module 34 generates a receive response frame matching the data frame decoded by the received frame decode module 33 and delivers a send request to the frame send and receive module 31. A received data disposal module 35 processes received data delivered from the data receive response module 34. A receive buffer control module 36 has a function of allowing the frame send and receive module 31 to use the receive buffer and a function of determining whether or not the receive buffer 32 is full. A resend number change request module 37 generates, when the receive buffer 32 is full as determined by the receive buffer control module 36, a resend number change request frame for requesting the data send modules 2 of the other computers to change the number of times of frame resending and sends it to the data send modules 2 of all of the computers.

The computer network system having the above construction may be operated as follows.

Figure 2:
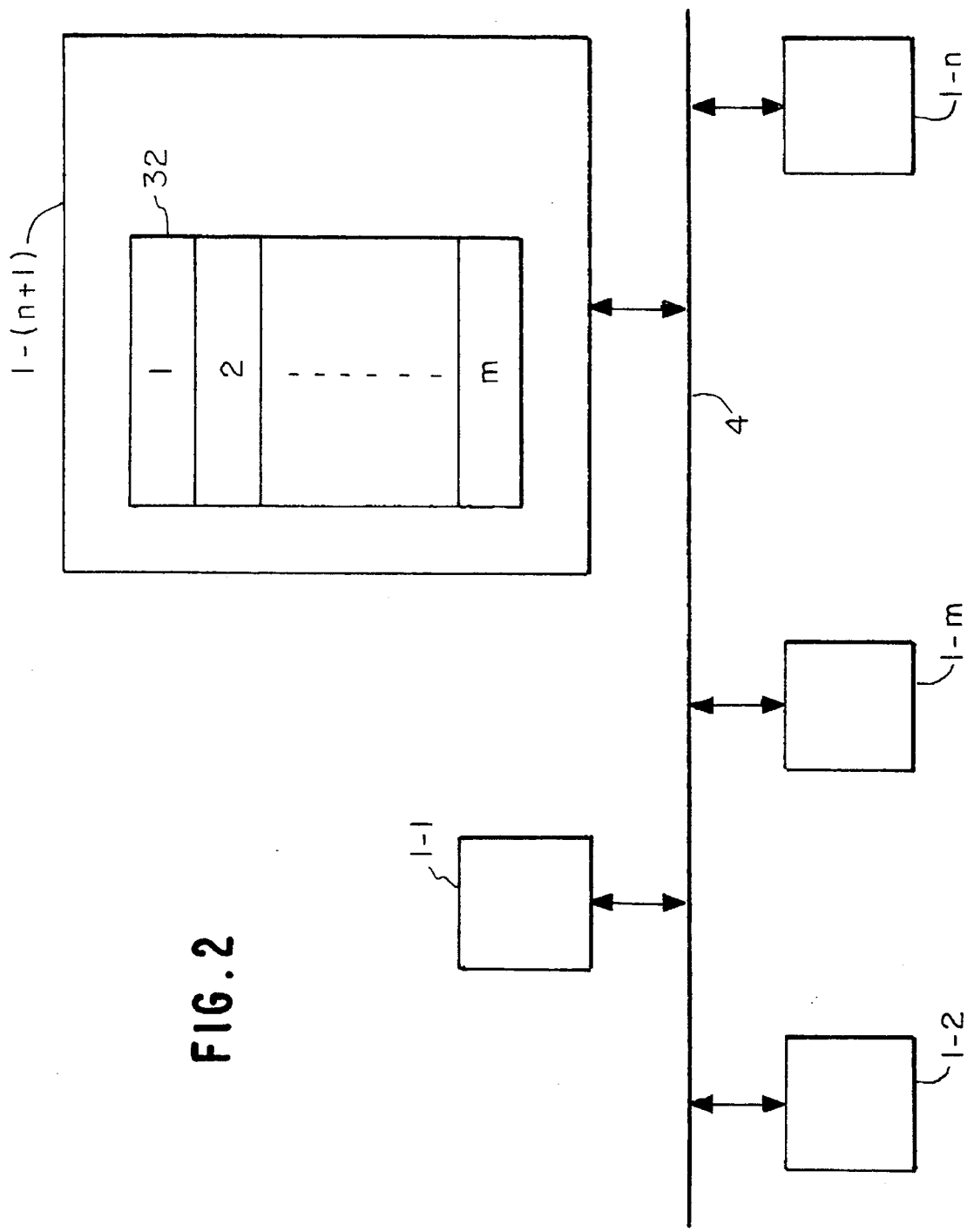
FIG. 2 is a block diagram schematically showing a receive buffer included in the embodiment.
Figure 3:
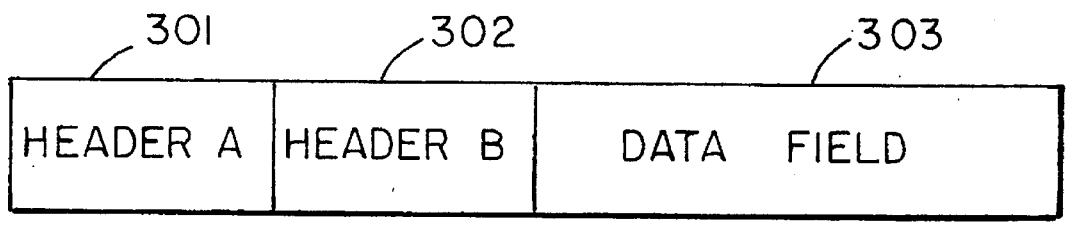
FIG. 3 shows a specific frame format applicable to the embodiment.

FIG. 2 shows the computers 1-1 to 1-(n+1) interconnected by the network 4 and will be used to describe the operation. FIG. 3 shows a specific frame format applicable to the embodiment. As shown, the frame is made up of a header A 301 containing a send address, destination address and so forth defined on the network 4 beforehand, a header B 302 containing information defining a communication control protocol, the type of data in the field 303 and so forth, and the data field itself 303.

Figure 6:
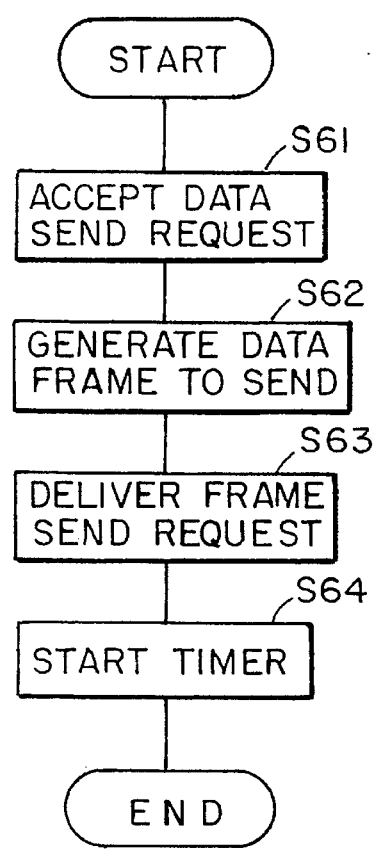
FIG. 6 is a flowchart representative of a procedure to be executed when a data send confirmation module included in the embodiment accepts a data send request from a data send request module included in the embodiment.

Assume that the computers 1-1 to 1-n send data to the computer 1-(n+1) substantially at the same time, and that the receive buffer 32 of the computer 1-(n+1) can accommodate m frames (n>m). The data send modules 2 of the computers 1-1 to 1-n generate data send requests meant for the computer 1-(n+1) substantially at the same time. Specifically, the data send request modules 22 of the computers 1-1 to 1-n each delivers a data send request to the associated data send confirmation module 24. On accepting the data send request (FIG. 6, step S61), the data send confirmation module 24 generates a data frame to be sent to the data receive module 3 of the computer 1-(n+1)(FIG. 6, S62), delivers a data frame send request to the frame send and receive module 21 (FIG. 6, S63), and then starts a timer for counting a predetermined period of time (FIG. 6, S64). On accepting the data frame send request (FIG. 4, S41), the frame send and receive module 21 sends the data frame to the data receive module 3 of the computer 1-(n+1) over the network 4. This occurs substantially at the same time in the computers 1-1 to 1-n.

Figure 5:
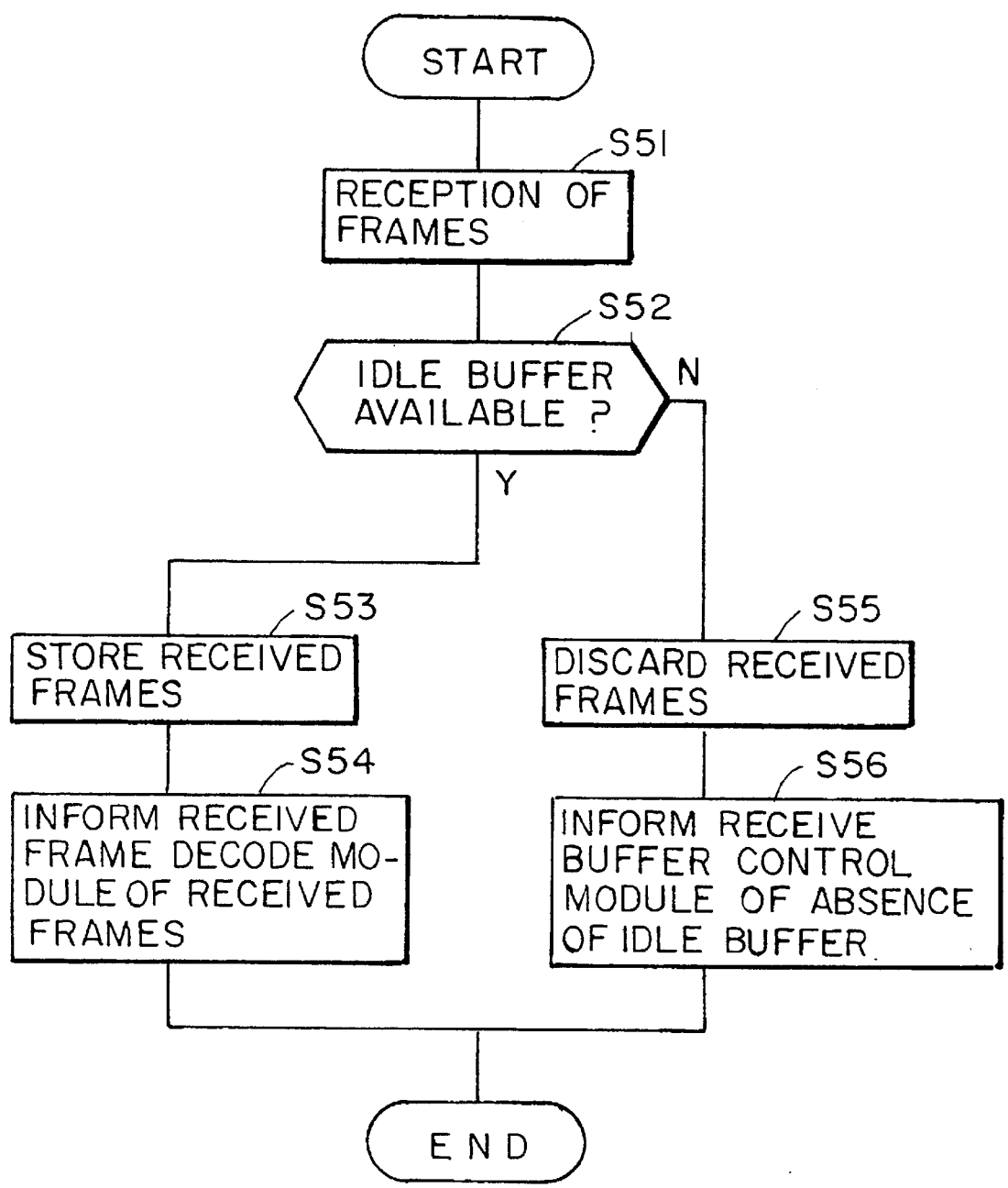
FIG. 5 is a flowchart representative of a procedure to be executed when the frame send and receive module receives a frame from a network.
Figure 9:
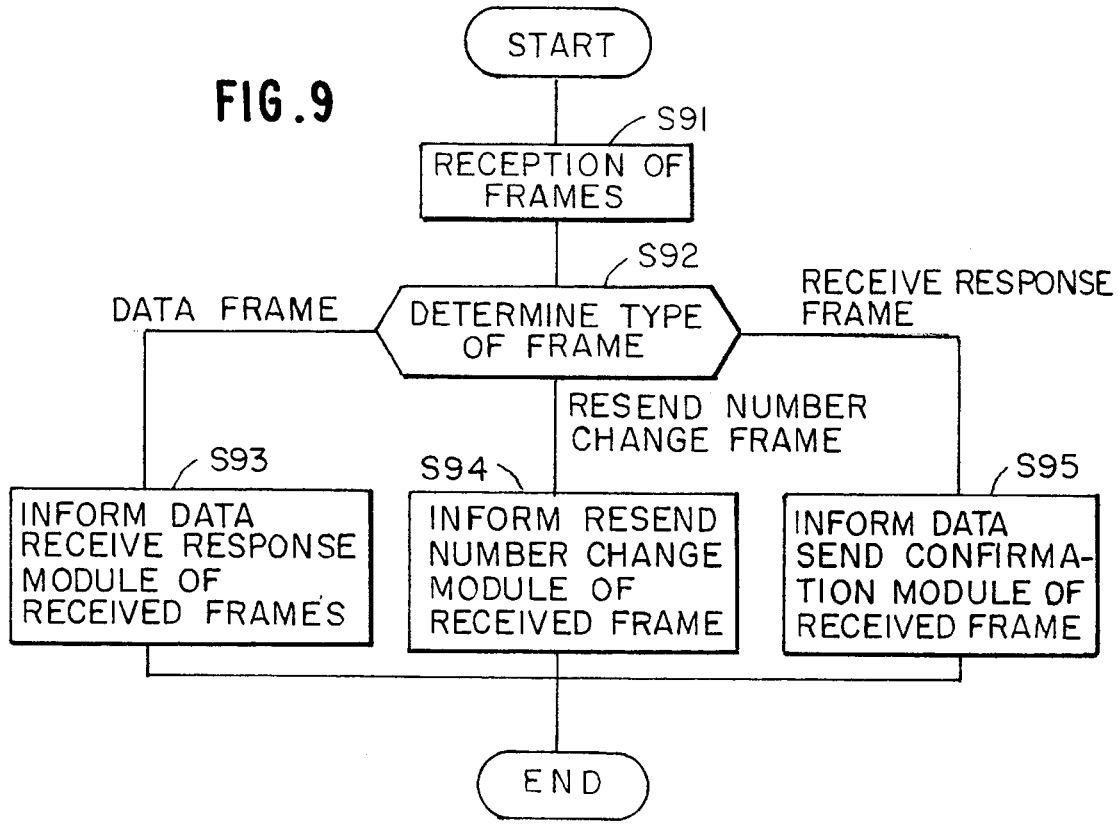
FIG. 9 is a flowchart demonstrating a procedure to be executed by the received frame decode module.
Figure 12:
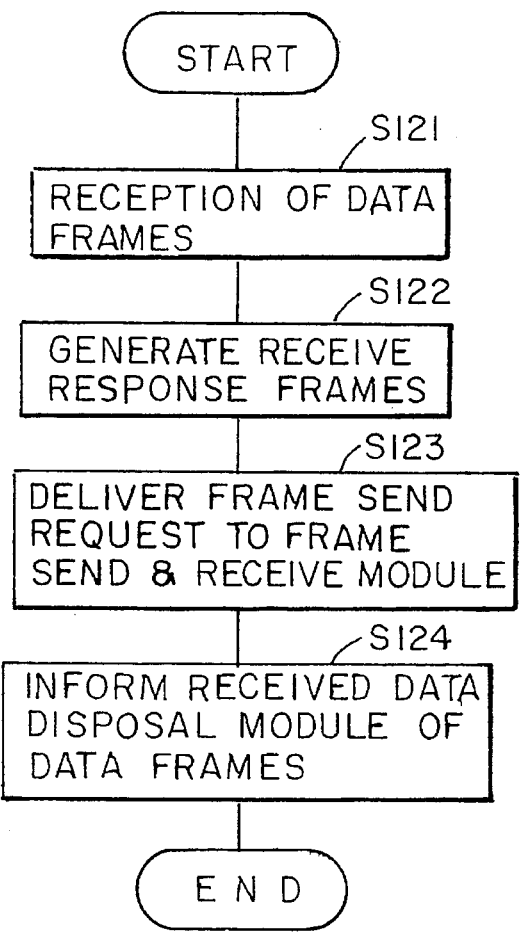
FIG. 12 is a flowchart representative of a procedure to be executed by a data receive response module included in the embodiment.

Successful Transmission: Let the data and the data frames sent from the data send modules 2 of the computers 1-1 to 1-n be referred to as data 1 to n and data frames 1 to n, respectively. The receive buffer 32 of the computer 1-(n+1) can accommodate m data frames, i.e., the data frames 1 to m. Specifically, assume that the data receive module 3 of the computer 1-(n+1) receives the data frames 1 to m. On receiving the data frames (FIG. 5, S51), the frame send and receive module 31 of the computer 1-(n+1) determines whether or not the receive buffer 32 is full (FIG. 5, S52). The frame send and receive module 31 then stores the data frames 1 to m in the receive buffer 32 (FIG. 5, S53) and transfers them to the received frame decode module 33 (FIG. 5, S54). As the received frame decode module 33 receives the frames from the frame send and receive module 31 (FIG. 9, S91), it determines the type of frame received (FIG. 9, S92). In this case, the decode module 33 determines that the received frames are data frames and then transfers the data frames to the data receive response module 34. On receiving the data frames from the decode module 33 (FIG. 12, S121), the data receive response module 34 generates receive response frames 1 to m associated with the data frames 1 to m, respectively (FIG. 12, S122), delivers a send request to the data send and receive module 31 for sending a receive response frame to the computers 1-1 to 1-m (FIG. 12, S123), and transfers the received data 1 to m to the received data disposal module 35 (FIG. 12, S124). The received data disposal module 35 executes processing with the data 1 to m delivered from the data receive response module 34 and, on completing the processing, informs the receive buffer control module 36 of the end of processing. In response, the receive buffer control module 36 allows the frame send and receive module 31 to again use the receive buffer 32. As a result, the data receive module 3 of the computer 1-(n+1) is again prepared for the reception of data. Further, the frame send and receive module 31 sends the receive response frames 1 to m meant for the computers 1-1 to 1-m, respectively, to the frame send and receive modules 21 of the data send modules 2 of the computers 1-1 to 1-m over the network 4.

Figure 8:
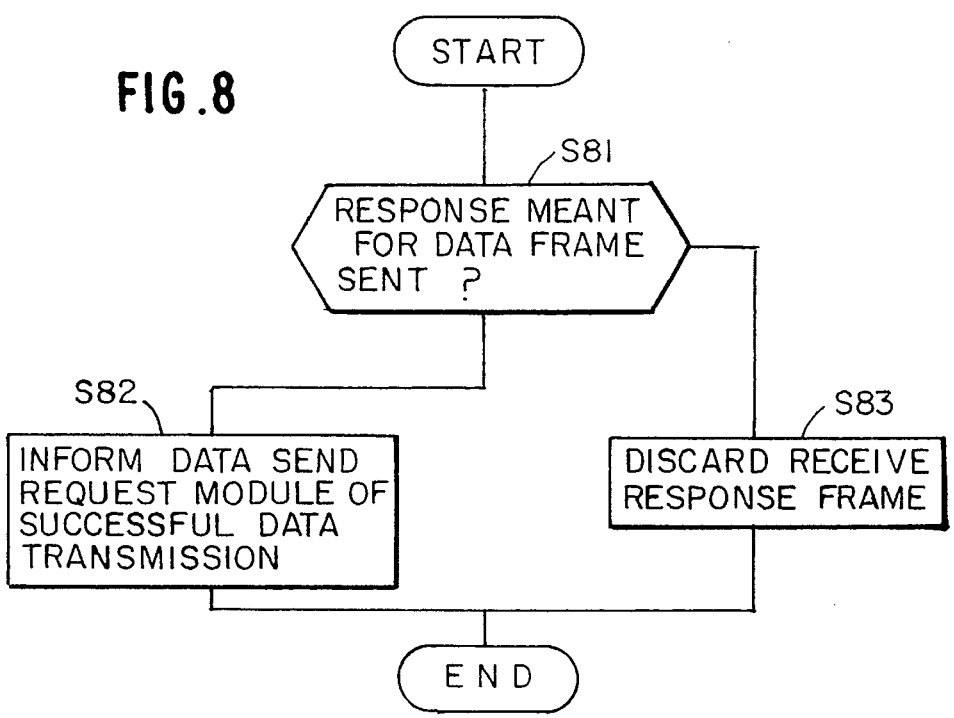
FIG. 8 is a flowchart indicative of a procedure to be executed when the data send confirmation module is informed of a receive response frame from a received frame decode module included in the embodiment.

The frame send and receive modules 21 of the computers 1-1 to 1-m each stores the respective frame received from the network 4 and transfers it to the associated received frame decode module 26 (FIG. 5). In response, the received frame decode module 26 determines the type of frame (FIG. 9, S92) and, since it is a receive response frame, transfers it to the data send confirmation module 24. The data send confirmation module 24 determines whether or not the frame delivered from the decode module 26 is a receive response frame associated with the data frame previously sent (FIG. 8, S81). In this case, by determining that the frame is a receive response frame associated with the data frame sent, the confirmation module 24 informs the data send request module 22 of the successful data transmission (FIG. 8, S82).

By the above procedure, it is possible to confirm that data were successfully sent from the computers 1-1 to 1-m to the computer 1-(n+1).

Figure 4:
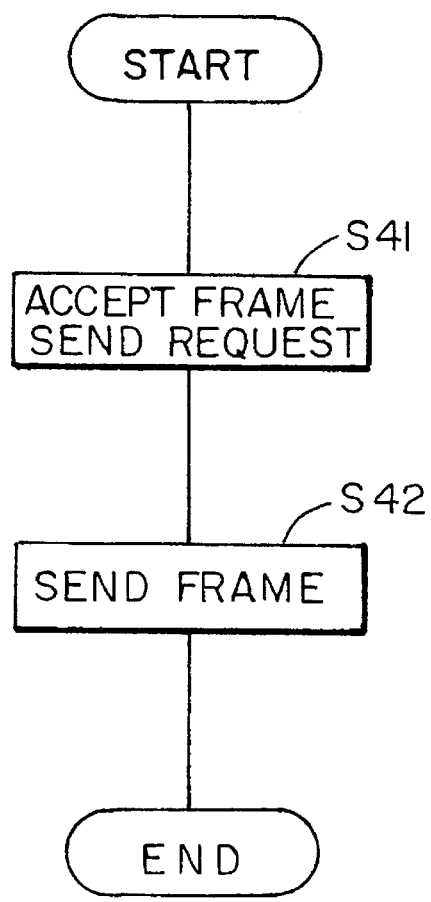
FIG. 4 is a flowchart demonstrating a procedure to be executed when a frame send and receive module included in the embodiment receives a frame send request.
Figure 10:
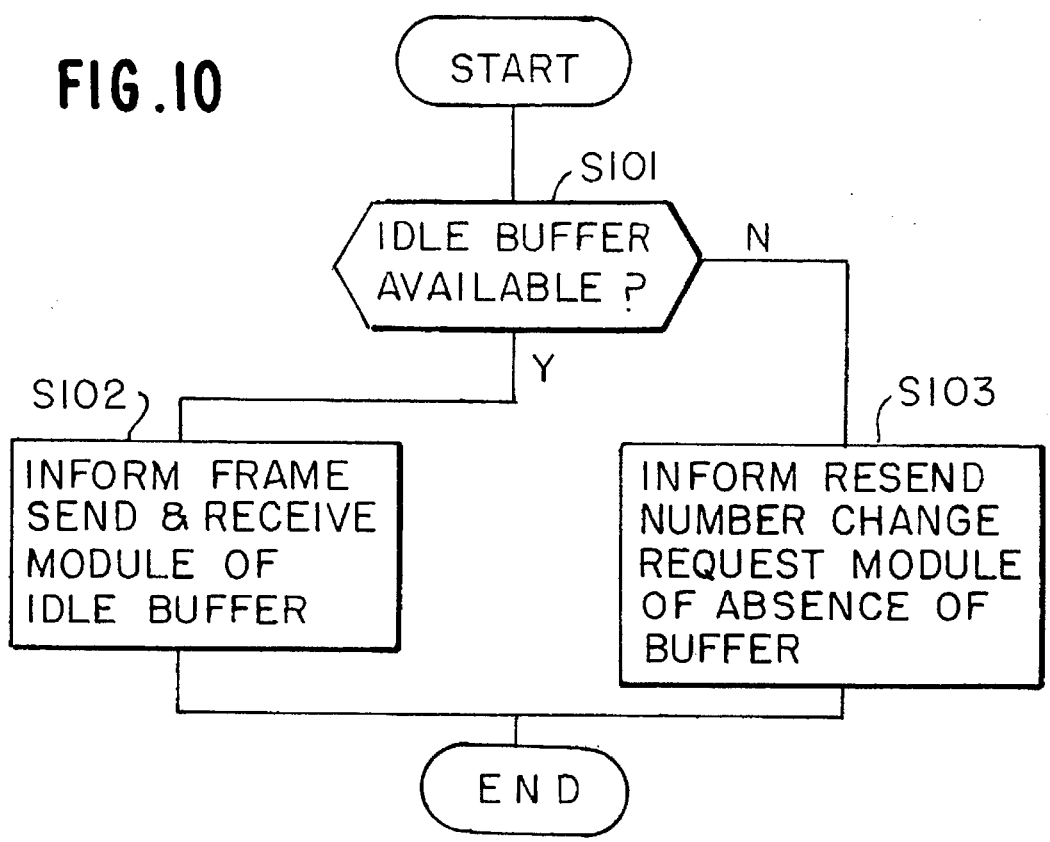
FIG. 10 is a flowchart showing processing particular to a receive buffer control module included in the embodiment.
Figure 13:
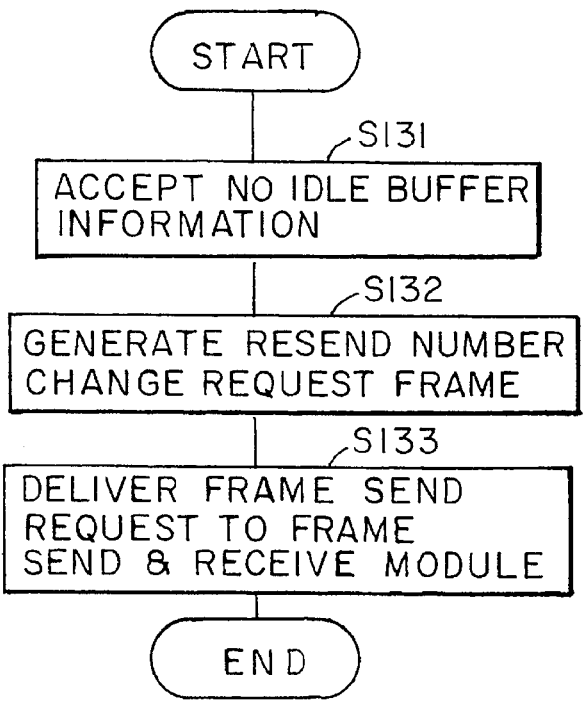
FIG. 13 is a flowchart showing processing particular to a resend number change request module included in the embodiment.

Unsuccessful Transmission: The receive buffer 32 of the computer 1-(n+1) has failed to receive the data frames (m+1) to n from the computers 1-(m+1) to 1-n due to the insufficient capacity thereof. Such computers 1-(m+1) to 1-n therefore await, respectively receive response frames (m+1) to n from the data receive module 3 of the computer 1-(n+1) for a period of time set therein (FIG. 6). However, since the frame send and receive module 31 of the computer 1-(n+1) has already stored the data frames 1 to m in the receive buffer 32 and cannot accommodate the data frames (m+1) to n, it discards the received data frames (FIG. 5, S55) and informs the receive buffer control module 36 of the fact that the receive buffer 32 is full (FIG. 5, S56). In response, the receive buffer control module 36 informs the resend number change request module 37 that the receive buffer 32 is full (FIG. 10, S103). As the resend number change request module 37 is informed of the full state of the receive buffer 32 (FIG. 13, S131), it generates a resend number change request frame for requesting all the computers 1-1 to 1-n to change the number of times that the data frame is to be resent (FIG. 13, S132) and delivers a frame send request to the frame send and receive module 31 (FIG. 13, S133). On accepting the frame send request (FIG. 4, S41), the frame send and receive module 31 sends the resend number change request frame to the computers 1-1 to 1-n (FIG. 4, S42).

Figure 11:
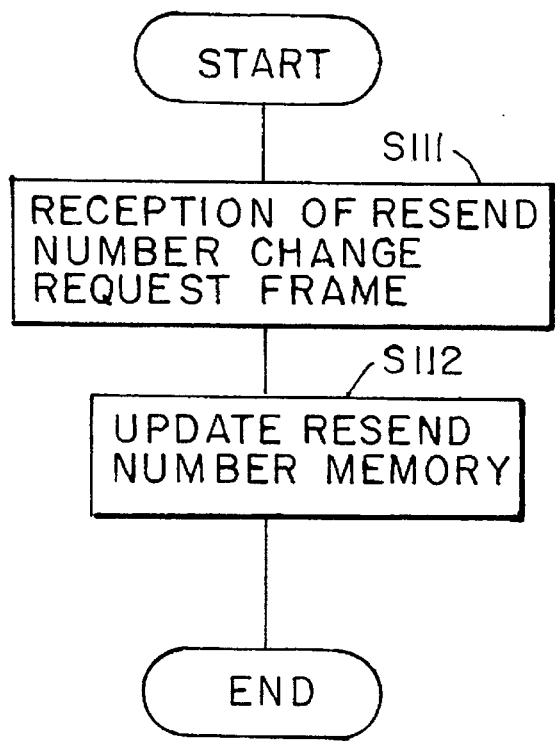
FIG. 11 is a flowchart showing processing particular to a resend number change module included in the embodiment.

Then, in each of the computers 1-1 to 1-n, the frame send and receive module 21 receives the frame from the computer 1-(n+1), stores it in the receive buffer 25, and transfers it to the received frame decode module 26 (FIG. 5). In response, the received frame decode module 26 determines the type of frame received (FIG. 9, S92). In this case, the decode module 26 determines that the received frame is a resend number change request frame, and then transfers it to the resend number change module 28 (FIG. 9, S94). On receiving the resend number change request frame, the resend number change module 28 separates from the frame a value representative of the number of times the resend number change request frame is to be resent and writes it in the resend number memory 23 (i.e. increases the number of times of resending) (FIG. 11).

Figure 7:
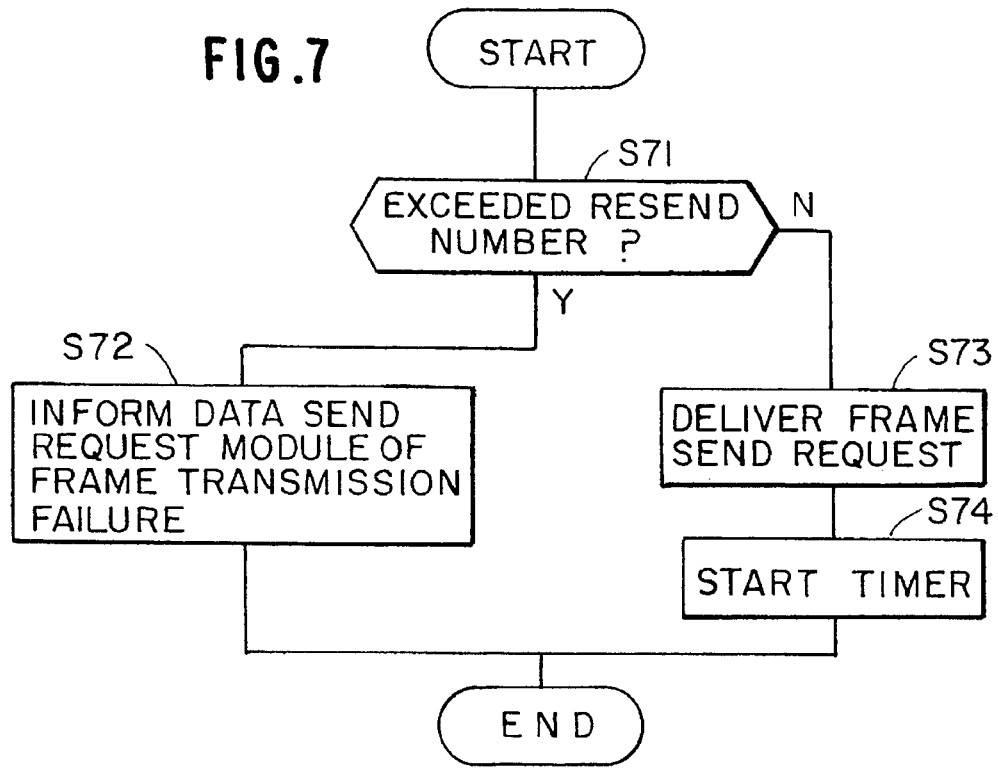
FIG. 7 is a flowchart showing processing to occur after a timer included in the data send confirmation module has counted up to a predetermined period of time.

In each of the computers 1-(m+1) to 1-n, when a receive response frame from the computer 1-(n+1) is not received, the data send confirmation module 24 requests the frame send and receive module 21 to repetitively send a data frame identical with the previously sent data frame a given number of times, set in the computer beforehand. If a receive response frame from the computer 1-(n+1) is not received even after the predetermined number of times of resending, the confirmation module 24 informs the data send request module 22 of the failure of frame transmission (FIG. 7). On accepting the frame send request from the confirmation module 24, the frame send and receive module 21 sends an associated one of the data frames (m+1) to n to the frame send and receive module 31 of the computer 1-(n+1) over the network 4 (FIG. 4).

In response, the frame send and receive module 31 of the computer 1-(n+1) discards the received data frames (m+1) to n since the receive buffer 32 is full (FIG. 5, S55). Then, this module 31 informs the receive buffer control module 36 of the full state of the receive buffer 32 (FIG. 5, S56). The receive buffer control module 36 in turn informs the resend number change request module 37 of such a state of the receive buffer 32 (FIG. 10, S103). As the resend number change request module 37 is informed of the full state (FIG. 13, S131), it generates a resend number change request frame for requesting all the computers 1-1 to 1-n connected to the network 4 to change the resend number (FIG. 13, S132) and then delivers a frame send request to the frame send and receive module 31 (FIG. 13, S133). On accepting the frame send request from the module 37 (FIG. 4, S41), the frame send and receive module 31 sends the resend number change request frame to the computers 1-1 to 1-n (FIG. 4, S42).

In each of the computers 1-1 to 1-n, the frame send and receive module 21 receives the frame from the computer 1-(n+1), stores it in the receive buffer 25, and transfers it to the receive frame decode module 26 (FIG. 5). In response, the decode module 26 determines the type of received frame received (FIG. 9, S92). Since the received frame is a resend number change request frame, the decode module 26 delivers it to the resend number change module 28 (FIG. 9, S94). On receiving the resend number change request frame, the resend number change module 28 separates the resend number from the frame and writes it in the resend number memory 23 (i.e. increases the resend number) (FIG. 11).

By the above-described sequence, the computers 1-1 to 1-n repetitively send their data frames until all the data have been received by the computer 1-(n+1).

It is to be noted that the network 4 may be implemented as a loop type network in place of the branch type network shown and described. Also, the resend number change request frame may be sent to the computers 1-1 to 1-n either sequentially or by broadcasting. Specifically, when the data send module 3 of the computer 1-(n+1) sends the resend number change request frame to the computers 1-1 to 1-n as a broadcast frame, the load on the receive module of the computer 1-(n+1) will be reduced to 1/n.

In summary, in accordance with the present invention, when a great number of computers send data to a single computer substantially at the same time, the receiving computer sends, every time a data receive module thereof becomes unable to receive data due to an insufficient buffer capacity, a resend number change request frame to all of the sending computers for requesting their data send modules to change the number of times a data frame is resent. This not only eliminates data transmission failures but also makes it unnecessary to change the system of the computers. Furthermore, if the data receive module of the receiving computer sends a resend number change request frame to the sending computers as a broadcast frame, the load on the data receive module of the receiving computer and the load on the network are reduced.

While the present invention has been described in conjunction with the preferred embodiment thereof, it will now be readily possible for those skilled in the art to put the present invention into practice in various other manners.

What is claimed is:

1. A computer network system for sending and receiving data by a frame synchronization system, comprising:

a plurality of computers; and a network connected to said plurality of computers for sending and receiving data;

said plurality of computers each comprising:

a data send module comprising means for sending a data frame to said network in response to a data send request, resend number storing means for storing a resend limit defining a maximum number of times that the data frame may be resent following an unsuccessful sending of the data frame, and means for updating a content of said resend number storing means upon receiving a frame comprising an instruction for changing the resend limit; and a data receive module comprising a receive buffer for storing the data frame received from said network, and means for sending, when said receive buffer is full, the frame comprising the instruction for changing the resend limit.

2. A system as claimed in claim 1, wherein said data receive module comprises:

a frame send and receive module for sending and receiving a frame to said network;

a receive buffer for storing the frame received by said frame send and receive module;

a received frame decode module for decoding the frame stored in said receive buffer and executing processing for each type of frame received;

a data receive response module for generating a receive response frame matching the frame decoded by each received frame decode module, and delivering a data send request to said frame send and receive module;

a received data disposal module for processing data received from said data receive response module;

a receive buffer control module responsive to end-of-processing information from said received data disposal module for executing first processing which allows said frame send and receive module to access said receive buffer and second processing which determines whether or not said receive buffer is full; and a resend number change request module for generating, when said receive buffer is full, as determined by said receive buffer control module, the frame comprising the instruction for changing the resend limit and sending the frame comprising the instruction for changing the resend limit to said network via said frame send and receive module.

3. A system as claimed in claim 1, wherein said data send module comprises:

a data send request module for generating a data send request;

a frame send and receive module for sending a data frame in response to the data send request from said data send request module and receiving a frame from said network;

a receive buffer for storing the frame received by said frame send and receive module;

a received frame decode module for decoding the frame stored in said receive buffer and executing processing for each type of frame received;

a data send confirmation module for executing processing which generates a data frame in response to the data send request from said data send request module and delivers the data frame send request to said frame send and receive module, for executing processing which determines that data transmission was successful upon receiving a receive response frame from said network, for executing processing which resends the data frame when the receive response frame is not received within a predetermined period of time, and for executing processing which informs said data send request module of a failure of data transmission when the receive response frame is not received even after the data frame has been repetitively sent, on the basis of a content of said resend number storing means; and a resend number change module for updating the content of said resend number storing means on the basis of the frame comprising the instruction for changing the resend limit, as decoded by said received frame decode module.

4. A system as claimed in claim 1 or 2, wherein said data receive module comprises means for sending the frame comprising the instruction for changing the resend limit as a broadcast frame.

5. A system as claimed in claim 1, wherein said means for updating a content of said resend number storing means, upon receiving the frame comprising the instruction for changing the resend limit, updates the content of said resend number storing means by replacing the resend limit presently stored with a new resend limit defining a number of times that the data frame may be resent that is greater than the maximum number of times defined by the presently stored resend limit.

6. A method, utilizing a plurality of computers and a network connecting the plurality of computers, for sending and receiving frame synchronized data; said method comprising the steps of:

sending a data frame to the network in response to a data send request;

storing a resend limit indicative of a number of times that the data frame is to be resent following an unsuccessful sending of the data frame;

updating the resend limit upon receiving a frame comprising an instruction for changing the resend limit from the network;

receiving and storing the data frame sent to the network; and sending, when a receive module is full, the frame comprising the instruction for changing the resend limit to the network.

7. A method as claimed in claim 6, further comprising the steps of:

generating the data send request;

executing processing which generates the data frame in response to the data send request;

executing processing which determines that data transmission was successful upon receiving a receive response frame from the network;

executing processing which resends the data frame when the receive response frame is not received within a predetermined period of time; and executing processing which informs of an unsuccessful data transmission when the receive response frame is not received even after said data frame has been resent a number of times corresponding to the resend limit.

8. A method as claimed in claim 6, wherein the frame comprising the instruction for changing the resend limit is sent as a broadcast frame.

9. A method as claimed in claim 6, further comprising the steps of:

decoding a frame received from the network and executing processing specific to each type of frame received;

generating a receive response frame matching the decoded frame;

processing the data frame received from the network;

executing first processing, which opens access to the receive module, in response to an end-of-processing signal, and executing second processing for determining whether or not the receive module is full; and generating, when the receive module is full, the frame comprising the instruction for changing the resend limit.

10. A method as claimed in claim 6, wherein said step of updating the resend limit comprises increasing the resend limit from a first predetermined value to a second predetermined value that is greater than the first predetermined value.

11. A computer network system for sending and receiving data by a frame synchronization system, comprising:

a plurality of computers; and a network connected to said plurality of computers for sending and receiving data;

said plurality of computers each comprising:
- a data frame transmitter; a resend number store that stores a value signifying the maximum number of times that the data frame is to be resent; and an input for updating the value in response to an increase signal for increasing the value; and
- a data frame receiver; and a value change transmitter for sending the increase signal in response to a capacity signal from said data frame receiver;
- wherein the increase signal comprises an instruction for increasing the value.

12. A system as claimed in claim 11, further comprising:

a receive buffer for storing a frame received by said data frame receiver;

a received frame decode module for decoding the frame stored in said receive buffer and for executing processing specific to each type of frame received;

a data receive response module for generating a receive response frame matching the frame decoded by said received frame decode module, and delivering a data send request to said data frame receiver;

a received data disposal module for processing data received from said data receive response module;

a receive buffer control module responsive to end-of-processing information from said received data disposal module for executing first processing which allows said data frame receiver to access said receive buffer and second processing which determines whether or not said receive buffer has attained a given capacity; and a resend number change request module for generating the increase signal when said receive buffer control module determines that the receive buffer has attained the given capacity.

13. A system as claimed in claim 11, further comprising:

a generator for generating a data send request;

a receive module associated with said data frame transmitter for receiving a frame from the network;

a receive buffer associated with said data frame transmitter for storing the frame received by said receive module;

a received frame decode module associated with said data frame transmitter for decoding the frame stored in said receive buffer and for executing processing specific to each type of frame received;

a data send confirmation module for executing processing which generates a data frame in response to the data send request from the generator and delivers a data frame send request to said data frame transmitter, for executing processing which determines that data transmission was successful upon receiving a receive response frame from the network, for executing processing to resend the data frame when the receive response frame is not received within a predetermined period of time, and for executing processing when the receive response frame is not received even after the data frame has been repetitively sent, on the basis of the value stored in said resend number store; and a resend number change module for updating the value in response to the increase signal as decoded by said received frame decode module.

14. A system as claimed in claim 11, wherein:

said data frame receiver comprises a receive buffer; and the capacity signal comprises a signal indicating a data capacity of said receive buffer.

15. A system as claimed in claim 14, wherein:

said receive buffer stores a frame received by said data frame receiver; and further comprising:
- a received frame decode module for decoding the frame stored in said receive buffer and for executing processing specific to each type of frame received;
- a data receive response module for generating a receive response frame matching the frame decoded by said received frame decode module, and delivering a data send request to said data frame receiver;
- a received data disposal module for processing data received from said data receive response module;
- a receive buffer control module responsive to end-of-processing information from said received data disposal module for executing first processing which allows said data frame receiver to access said receive buffer and second processing which determines whether or not said receive buffer has attained a given capacity; and
- a resend number change request module for generating the increase signal when said receive buffer control module determines that the receive buffer has attained the given capacity.

16. A system as claimed in claim 14, further comprising:

a generator for generating a data send request;

a receive module associated with said data frame transmitter for receiving a frame from the network;

a receive buffer associated with said data frame transmitter for storing the frame received by said receive module;

a received frame decode module associated with said data frame transmitter for decoding the frame stored in said receive buffer and for executing processing specific to each type of frame received;

a data send confirmation module for executing processing which generates a data frame in response to the data send request from the generator and delivers a data frame send request to said data frame transmitter, for executing processing which determines that data transmission was successful upon receiving a receive response frame from the network, for executing processing to resend the data frame when the receive response frame is not received within a predetermined period of time, and for executing processing when the receive response frame is not received even after the data frame has been repetitively sent, on the basis of the value stored in said resend number store; and a resend number change module for updating the value in response to the increase signal as decoded by said received frame decode module.

* * * * *